(12) United States Patent
Hou et al.

(10) Patent No.: US 11,988,862 B2
(45) Date of Patent: May 21, 2024

(54) LIQUID CRYSTAL PANEL AND METHOD OF FABRICATING SAME

(71) Applicant: Wuhan China Star Optoelectronics Technology Co., Ltd., Hubei (CN)

(72) Inventors: Chihyuan Hou, Hubei (CN); Changchih Huang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 834 days.

(21) Appl. No.: 17/051,480

(22) PCT Filed: Jun. 23, 2020

(86) PCT No.: PCT/CN2020/097639
§ 371 (c)(1),
(2) Date: Oct. 29, 2020

(87) PCT Pub. No.: WO2021/248556
PCT Pub. Date: Dec. 16, 2021

(65) Prior Publication Data
US 2023/0341614 A1    Oct. 26, 2023

(30) Foreign Application Priority Data
Jun. 10, 2020 (CN) .......................... 202010523008.1

(51) Int. Cl.
*G02F 1/13357* (2006.01)
*F21V 8/00* (2006.01)
(Continued)

(52) U.S. Cl.
CPC ........... *G02B 6/0056* (2013.01); *G02B 6/004* (2013.01); *G02B 6/0051* (2013.01);
(Continued)

(58) Field of Classification Search
CPC .... G02B 6/0056; G02B 6/004; G02B 6/0051; G02B 6/0055; G02F 1/13362; G02F 1/136222; G02F 1/1368
See application file for complete search history.

(56) References Cited

U.S. PATENT DOCUMENTS

2006/0290842 A1* 12/2006 Epstein ................. G02F 1/1335
349/113
2008/0106672 A1    5/2008 Kim et al.

FOREIGN PATENT DOCUMENTS

CN    106324742    1/2017
CN    106855648    6/2017
(Continued)

OTHER PUBLICATIONS

CN 106855648 A machine translation (Year: 2017).*

*Primary Examiner* — James A Dudek

(57) ABSTRACT

A liquid crystal panel and a method of fabricating the same are described. The liquid crystal panel has: a backlight module and an array substrate facing each other; and a first metal wire gate layer disposed between the backlight module and the array substrate, wherein the first metal wire gate layer is formed through a nano-imprinting step to have a thickness greater than zero and less than or equal to 0.1 mm, the first metal wire gate layer has a plurality of first metal wires, a distance between the plurality of first metal wires is greater than zero and less than 120 nm, and each of the plurality of first metal wires has a width greater than zero and less than 60 nm. The liquid crystal panel can reduce a thickness of the fabricated liquid crystal panel.

9 Claims, 5 Drawing Sheets

(51) Int. Cl.
*G02F 1/1362* (2006.01)
*G02F 1/1368* (2006.01)

(52) U.S. Cl.
CPC ....... *G02B 6/0055* (2013.01); *G02F 1/13362* (2013.01); *G02F 1/136222* (2021.01); *G02F 1/1368* (2013.01)

(56) References Cited

FOREIGN PATENT DOCUMENTS

| | | |
|---|---|---|
| CN | 206848653 | 1/2018 |
| CN | 108490677 | 9/2018 |
| CN | 110703494 | 1/2020 |
| KR | 10-2017-0011616 | 2/2017 |

\* cited by examiner

LIQUID CRYSTAL PANEL AND METHOD OF FABRICATING SAME

RELATED APPLICATIONS

This application is a National Phase of PCT Patent Application No. PCT/CN2020/097639 having International filing date of Jun. 23, 2020, which claims the benefit of priority of Chinese Patent Application No. 202010523008.1 filed on Jun. 10, 2020. The contents of the above applications are all incorporated by reference as if fully set forth herein in their entirety.

FIELD AND BACKGROUND OF THE INVENTION

The present disclosure relates to displays, and more particularly to a liquid crystal panel and a method of fabricating the same.

In a liquid crystal display (LCD), one of functions of a backlight module is to convert a point light source into a surface light source. Therefore, various optical films are formed in the backlight module to promote the above-mentioned functions. However, a number of optical films manufactured according to the existing method is excessive, which in turn increases a thickness of a liquid crystal panel, so there is still room for improvement.

Therefore, it is necessary to provide a liquid crystal panel and a liquid crystal panel and a method of fabricating the same to solve problems in the conventional technology.

SUMMARY OF THE INVENTION

From above, the present disclosure provides a liquid crystal panel and a method of fabricating the same to solve problems that the thickness of the liquid crystal panel in the prior art is increased.

An object of the present disclosure is to provide a liquid crystal panel and a method of fabricating the same, which forms a first metal wire gate layer on the backlight module or the array substrate by a nano-imprinting step to reduce the thickness of the liquid crystal panel.

To achieve the above object of the present disclosure, an embodiment of the present disclosure provides a liquid crystal panel comprising: a backlight module and an array substrate facing each other, wherein the backlight module comprises a light source and a polarizing sheet, wherein the light source is adjacent to the polarizing sheet; and a first metal wire gate layer disposed between the backlight module and the array substrate, wherein the first metal wire gate layer is formed through a nano-imprinting step to have a thickness greater than zero and less than or equal to 0.1 mm, the first metal wire gate layer comprises a plurality of first metal wires, a distance between the plurality of first metal wires is greater than zero and less than 120 nm, and each of the plurality of first metal wires has a width greater than zero and less than 60 nm, wherein material of the first metal wire gate layer comprises at least one of aluminum, iron, copper, chromium, silver, and gold.

In an embodiment of the present disclosure, the array substrate further comprises an outer glass, a second metal wire gate layer, a color filter, a liquid crystal layer, and a substrate, all of which are arranged in sequence arranged in sequence, wherein the second metal wire gate layer is formed by a nano-imprinting method, and the first metal wire gate layer is disposed between the backlight module and the substrate.

In an embodiment of the present disclosure, material of the second metal wire gate layer comprises the array substrate further comprises an outer glass, a quantum dot color filter, a second metal wire gate layer, a liquid crystal layer, and a substrate, all of which are arranged in sequence, wherein the second metal wire gate layer is formed by a nano-imprinting method, and the first metal wire gate layer is disposed between the backlight module and the substrate.

In an embodiment of the present disclosure, the polarizing sheet comprises: a reflecting sheet, a light guide plate, and a diffusion sheet. The light guide plate is disposed on the reflecting sheet. The diffusion sheet is disposed on the light guide plate, wherein the light source is adjacent to the light guide plate, and the first metal wire gate layer is disposed on the diffusion sheet.

In an embodiment of the present disclosure, the polarizing sheet further comprises a brightness enhancement film, and the brightness enhancement film is disposed between the first metal wire gate layer and the diffusion sheet.

In an embodiment of the present disclosure, the polarizing sheet further comprises a glass substrate, the glass substrate is disposed on the diffusion sheet, and the first metal wire gate layer is disposed on the glass substrate.

In an embodiment of the present disclosure, the light guide plate further comprises a plurality of dots, wherein the plurality of dots are formed by a nano-imprinting method, each of the plurality of dots has a size between 0.1 and 1 mm, and a pitch between the plurality of dots is between 0.1 and 10 mm.

To achieve the above object of the present disclosure, an embodiment of the present disclosure provides a liquid crystal panel comprising: a backlight module and an array substrate facing each other; and a first metal wire gate layer disposed between the backlight module and the array substrate, wherein the first metal wire gate layer is formed through a nano-imprinting step to have a thickness greater than zero and less than or equal to 0.1 mm, the first metal wire gate layer comprises a plurality of first metal wires, a distance between the plurality of first metal wires is greater than zero and less than 120 nm, and each of the plurality of first metal wires has a width greater than zero and less than 60 nm.

In an embodiment of the present disclosure, the array substrate further comprises an outer glass, a second metal wire gate layer, a color filter, a liquid crystal layer, and a substrate, all of which are arranged in sequence arranged in sequence, wherein the second metal wire gate layer is formed by a nano-imprinting method, and the first metal wire gate layer is disposed between the backlight module and the substrate.

In an embodiment of the present disclosure, material of the second metal wire gate layer comprises the array substrate further comprises an outer glass, a quantum dot color filter, a second metal wire gate layer, a liquid crystal layer, and a substrate, all of which are arranged in sequence, wherein the second metal wire gate layer is formed by a nano-imprinting method, and the first metal wire gate layer is disposed between the backlight module and the substrate.

In an embodiment of the present disclosure, the backlight module comprises a light source and a polarizing sheet, wherein the light source is adjacent to the polarizing sheet.

In an embodiment of the present disclosure, the polarizing sheet comprises: a reflecting sheet, a light guide plate, and a diffusion sheet. The light guide plate is disposed on the reflecting sheet. The diffusion sheet is disposed on the light guide plate, wherein the light source is adjacent to the light guide plate, and the first metal wire gate layer is disposed on the diffusion sheet.

In an embodiment of the present disclosure, the polarizing sheet further comprises a brightness enhancement film, and the brightness enhancement film is disposed between the first metal wire gate layer and the diffusion sheet.

In an embodiment of the present disclosure, the polarizing sheet further comprises a glass substrate, the glass substrate is disposed on the diffusion sheet, and the first metal wire gate layer is disposed on the glass substrate.

In an embodiment of the present disclosure, the light guide plate further comprises a plurality of dots, wherein the plurality of dots are formed by a nano-imprinting method, each of the plurality of dots has a size between 0.1 and 1 mm, and a pitch between the plurality of dots is between 0.1 and 10 mm.

In an embodiment of the present disclosure, material of the first metal wire gate layer comprises at least one of aluminum, iron, copper, chromium, silver, and gold.

Further, another embodiment of the present disclosure provides a method of fabricating a liquid crystal panel comprising steps of: providing a backlight module and an array substrate; performing a nano-imprinting step to form a first metal wire gate layer on the backlight module or on the array substrate; and assembling the backlight module and the array substrate, wherein the first metal wire gate layer is located between the backlight module and the array substrate.

In an embodiment of the present disclosure, the array substrate further comprises a second metal wire gate layer, wherein the second metal wire gate layer is formed by a nano-imprinting method.

In an embodiment of the present disclosure, material of the second metal wire gate layer comprises at least one of aluminum, iron, copper, chromium, silver, and gold.

In an embodiment of the present disclosure, the backlight module comprises a light source and a polarizing sheet, wherein the light source is adjacent to the polarizing sheet.

Compared with the conventional technologies, the liquid crystal panel and the method of fabricating the same of the present disclosure form a first metal wire gate layer on the backlight module or the array substrate through a nano-imprinting step to reduce a thickness of the liquid crystal panel.

In order to make the above contents of the present disclosure more obvious and understandable, preferred embodiments are described in detail below, and in conjunction with the attached drawings, detailed descriptions are as follows:

DESCRIPTION OF SPECIFIC EMBODIMENTS OF THE INVENTION

Following descriptions of embodiments refer to the attached drawings to illustrate specific embodiments of the present disclosure that can be implemented. Furthermore, directional terms mentioned in the present disclosure, such as up, down, top, bottom, front, back, left, right, inner, outer, side, surrounding, center, horizontal, horizontal, vertical, longitudinal, axial, radial, the uppermost layer, or the lowermost layer, etc., are only for the direction of referring to the additional drawings. Therefore, directional terminology is used to illustrate and understand the present disclosure, not to limit the present disclosure.

Figure 1:
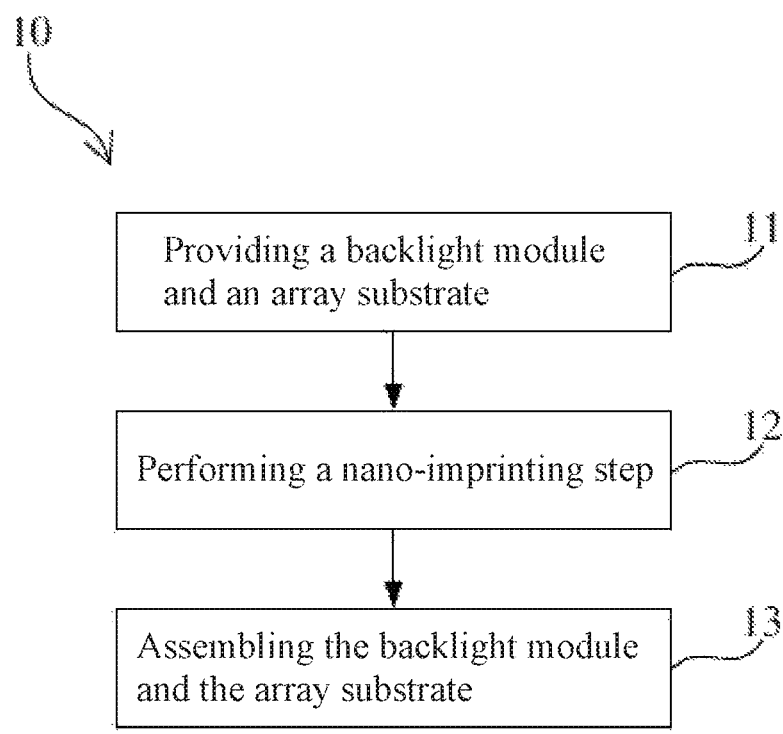
FIG. 1 is a flowchart of a method of fabricating a liquid crystal panel according to an embodiment of the disclosure.

Referring to FIG. 1, in an embodiment of the present disclosure, a method 10 of fabricating a liquid crystal panel includes steps 11 to 13 of: providing a backlight module and an array substrate (step 11); performing a nano-imprinting step to form a first metal wire gate layer on the backlight module or on the array substrate (step 12); and assembling the backlight module and the array substrate, wherein the first metal wire gate layer is located between the backlight module and the array substrate (step 13).

Figure 2A:
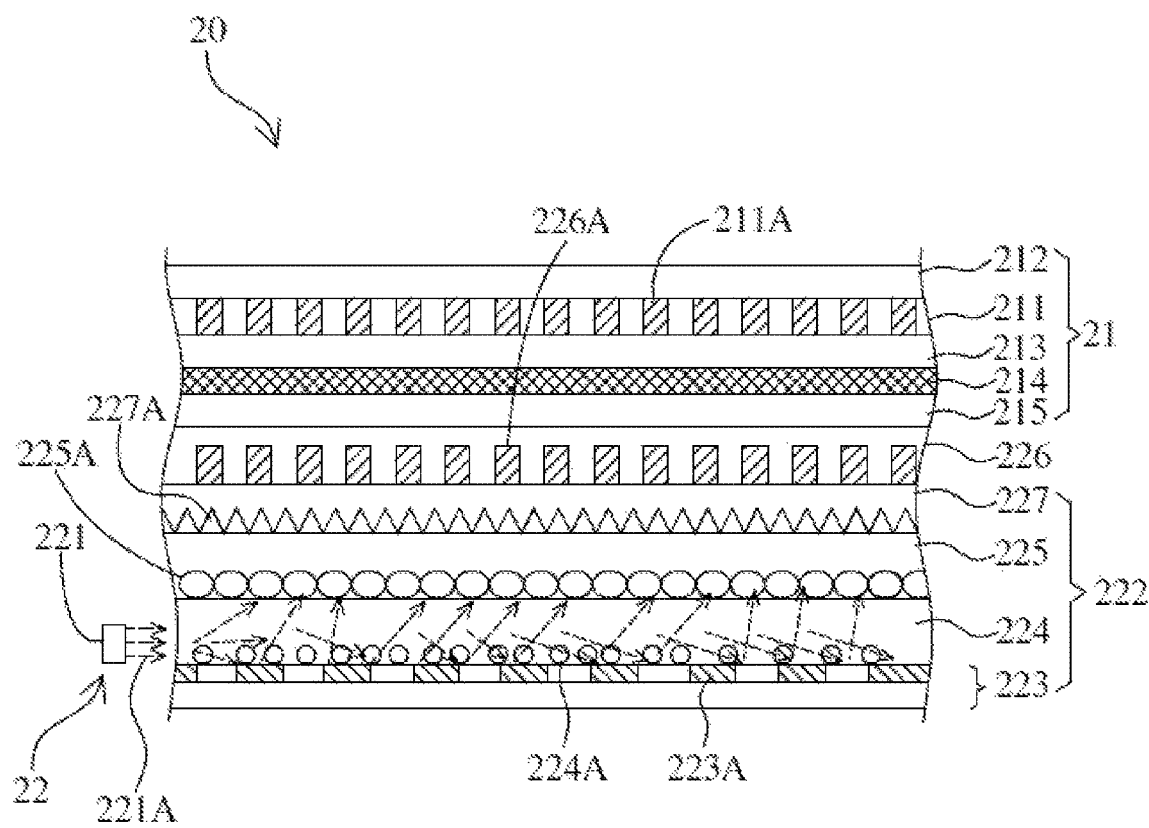
FIG. 2A is a schematic cross-sectional view of a liquid crystal panel according to an embodiment of the disclosure.
Figure 2B:
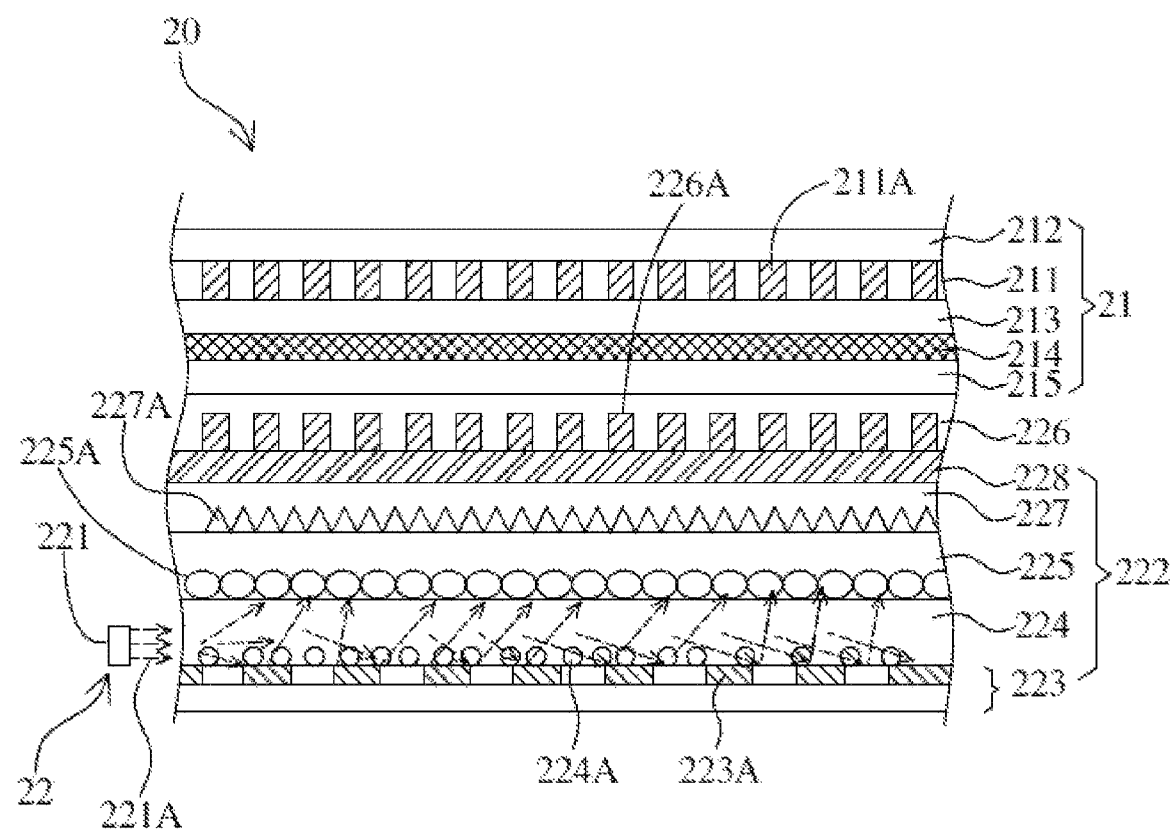
FIG. 2B is a schematic cross-sectional view of a liquid crystal panel according to another embodiment of the disclosure.

Referring to FIG. 1 together with FIG. 2A and FIG. 2B, in an embodiment of the present disclosure, the method 10 of fabricating the liquid crystal panel has a step 11 of: providing a backlight module 21 and an array substrate 22. In the step 11, materials and fabricating methods of the backlight module 21 and the array substrate 22 may refer to common materials or fabricating methods in general semiconductor processes. In an embodiment, a part of components of the backlight module 21 and the array substrate 22 may be formed by a nano-imprinting method to reduce a thickness of the liquid crystal panel 20. In an example, the array substrate 21 further includes a second metal wire gate layer 211, wherein the second metal wire gate layer 211 is formed by a nano-imprinting method. Therefore, the thickness of the liquid crystal panel 20 can be reduced. In another example, material of the second metal wire gate layer 211 includes at least one of aluminum, iron, copper, chromium, silver, and gold. In yet another example, the second metal wire gate layer 211 includes a plurality of second metal wires 211A, a spacing between adjacent second metal wires is greater than zero and less than 120 nm, and each of the plurality of second metal wires 211A has a width greater than zero and less than 60 nanometers. In one example, before forming the second metal wire gate layer 211, a dulling material (metal oxide layer) needs to be fabricated, such as metal oxides such as molybdenum oxide and chromium oxide.

It should be mentioned that in an example, the second metal wire gate layer 211 is used as a built-in polarizing sheet. For example, the second metal wire gate layer 211 is disposed between the outer glass 212 and the color filter 213. In another embodiment, the array substrate 21 includes, for example, the outer glass 212, the second metal wire gate layer 211, the color filter 213, the liquid crystal layer 214, and the substrate 215, all of which are arranged in sequence. The second metal wire gate layer 211 is formed by a nano-imprinting method, and the first metal wire gate layer is disposed between the backlight module 22 and the substrate 215.

It is worth mentioning that the nano-imprinting method is to use electron beamlithography to make a nano-scale pattern on a template, and then to press the mother mold on the coating material to achieve pattern transfer purpose. The nano-imprinting method has advantages of mass production, low cost, and thin graphics.

In an embodiment, the backlight module 22 comprises a light source 221 and a polarizing sheet 222, wherein the light source 221 is adjacent to the polarizing sheet 222. In an embodiment, the light source 221 is, for example, a side-in light source. In another example, the polarizing sheet 222 comprises a reflecting sheet 223, a light guide plate 224, and a diffusion sheet 225. The reflecting sheet 223 has reflecting bumps 223A for reflecting light. The light guide plate 224 is disposed on the reflecting sheet 223. The diffusion sheet 225 is disposed on the light guide plate 224, wherein the first metal wire gate layer 226 is disposed on the diffusion sheet 225, and the light source 221 is adjacent to the light guide plate 224. In an embodiment, the diffusion sheet 225 may include a plurality of diffusion particles 225A. For example, a coating method is used to coat the plurality of diffusion particles 225A on the diffusion sheet. In yet another example, the light guide plate 224 further includes a plurality of dots 224A, wherein the plurality of dots 224A are formed by a nano-imprinting method, and each of the plurality of dots 224A has a size of 0.1 to 1 mm and a pitch between the plurality of dots is between 0.1 and 10 mm. Since the dots 224A of the light guide plate 224 are formed by the nano-imprinting method, the thickness of the liquid crystal panel can be reduced. In an example, a shape of the dots 224A includes at least one of a circle, an ellipse, and a polygon, where the polygon is a square or a hexagon, for example.

In an embodiment, the polarizing sheet 22 further comprises a brightness enhancement film 227, and the brightness enhancement film 227 is disposed between the first metal wire gate layer 226 and the diffusion sheet 225 for improving light brightness. In an example, the brightness enhancement film 227 has a prism structure 227A, and the refractive index of the prism structure 227A is between 1.5 and 1.6. The brightness enhancement film 227 may be formed by a nano-imprinting method. However, it is worth mentioning that the thickness of the backlight module can be reduced by omitting production of the brightness enhancement film.

In an embodiment of the present disclosure, the method 10 of fabricating the liquid crystal panel has a step 12 of: performing a nano-imprinting step to form a first metal wire gate layer 226 on the backlight module 21 or on the array substrate 22. In the step 12, the first metal wire gate layer 226 is mainly formed on the backlight module 22 or the array substrate 21 by a nano-imprinting method, so as to reduce the thickness of the liquid crystal panel 20. In one embodiment, material of the first metal wire gate layer 226 includes at least one of aluminum, iron, copper, chromium, silver, and gold. In yet another example, the first metal wire gate layer 226 includes a plurality of first metal wires 226A, and a distance between adjacent first metal wires 226A is greater than zero and less than 120 nanometers. Each of the plurality of first metal wires 226A has a width greater than zero and less than 60 nm. It should be mentioned here that, in general, each of the backlight module 22 and the array substrate 21 has an outer glass or an outer plastic as a substrate. In the above case, the first metal wire gate layer 226 may be formed on the outer glass or the outer plastic of the backlight module 22 or the outer glass or the outer plastic of the array substrate 21. For example, the polarizing sheet 222 of the backlight module 22 may include a glass substrate 228 (as shown in FIG. 2B or 2D), the glass substrate 228 is disposed on the diffusion sheet 225, and in the nano-imprinting In the step, the first metal wire gate layer 226 is formed on the glass substrate 228. It is mentioned here that flatness of the surface of the glass substrate 228 is better than that of the plastic substrate, and therefore it is helpful the yield of producing the first metal wire gate layer 226 by using the nano-imprinting method.

In another aspect, the backlight module 22 may not include an outer glass or outer plastic facing the array substrate 21, and when the nano-imprinting step is performed, the first metal wire gate layer 226 is formed on the outer glass or on the outer plastic of the array substrate 21. Therefore, this method can further reduce the thickness of the liquid crystal panel 20.

In an embodiment of the present disclosure, the method 10 of fabricating the liquid crystal panel has a step 13 of: assembling the backlight module 22 and the array substrate 21, wherein the first metal wire gate layer 226 is located between the backlight module 22 and the array substrate 21. In this step 13, the assembled light source 221 of the backlight module 22 is away from the array substrate 21. In this way, light 221A emitted by the light source 221 can pass through each film layer of the backlight module 22 to achieve an effect of converting a point light source into a surface light source.

Figure 2C:
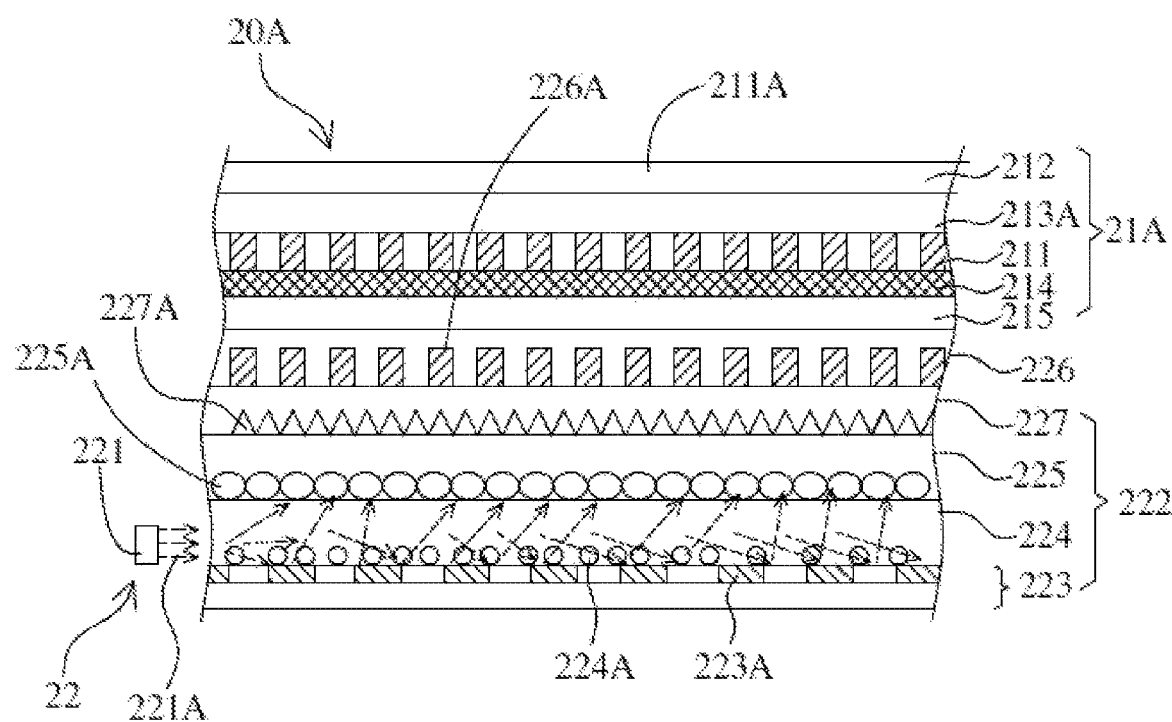
FIG. 2C is a schematic cross-sectional view of a liquid crystal panel according to yet another embodiment of the disclosure.
Figure 2D:
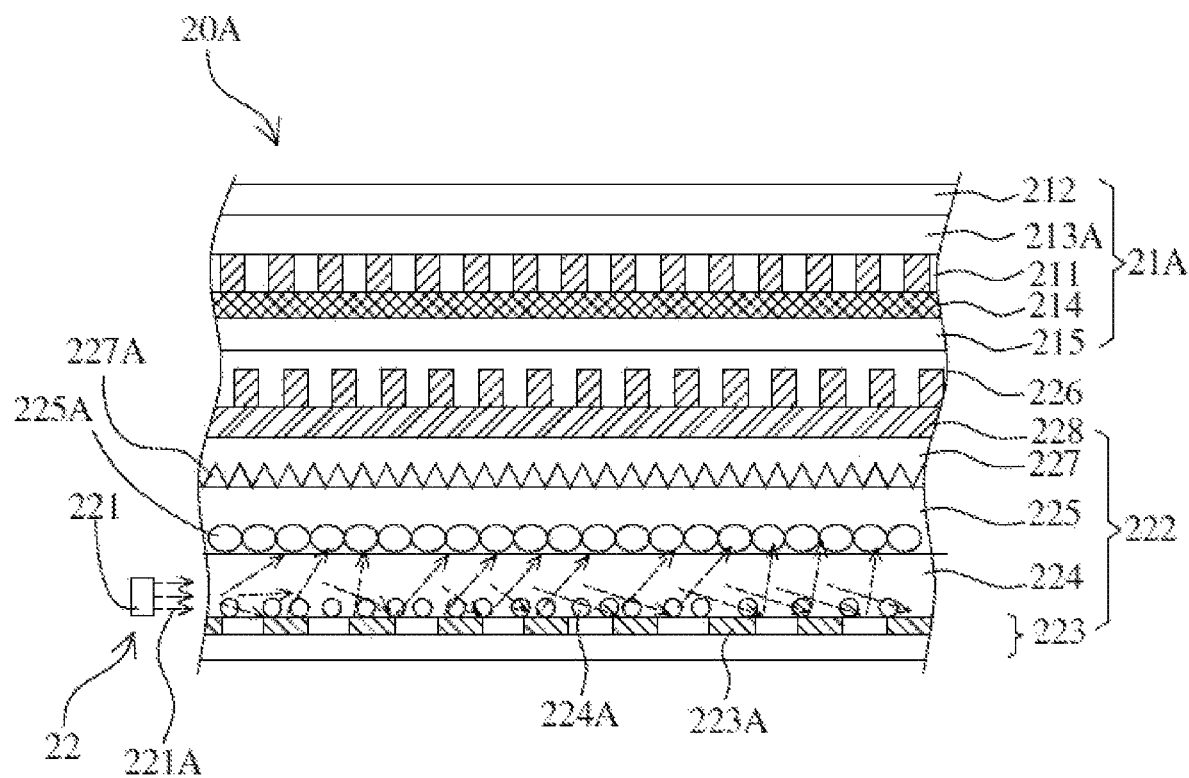
FIG. 2D is a schematic cross-sectional view of a liquid crystal panel according to a further embodiment of the disclosure.

In an embodiment, the method 10 of fabricating the liquid crystal panel of an embodiment of the present disclosure can also be applied to fabricate a quantum dot color filter type (QDCF type) liquid crystal panel 20A (as shown in FIG. 2C or FIG. 2D), where the QDCF type liquid crystal panel refers to the application of quantum dots to color filters to replace existing color filters. In one example, the array substrate 21A of the quantum dot color filter type (QDCF type) liquid crystal panel 20A includes, for example, an outer glass 212, a quantum dot color filter 213A, a second metal wire gate layer 211, and a liquid crystal layer 214, and a substrate 215 having an array structure, wherein the second metal wire gate layer 211 is formed by a nano-imprinting method, and the first metal wire gate layer 226 is disposed between the backlight module 227 and the substrate 215. Specifically, in the QDCF type liquid crystal panel 20A, an original array substrate 21A encounters a problem that the thickness of the liquid crystal panel 20A cannot be reduced when the metal wire gate layer is fabricated. Therefore, if the first metal wire gate layer 226 is formed by applying the nano-imprinting step, the thickness of the first metal wire gate layer 226 can be reduced from about 0.4 mm to about 0.1 mm (e.g., greater than 0 mm and less than or equal to 0.1 mm), and the thickness of the liquid crystal panel 20A is reduced.

It can be seen from the above that the method 10 of fabricating the liquid crystal panel according to an embodiment of the present disclosure can have at least the following advantages that:

(1) The film layer in the backlight module is fabricated by using a nano-imprinting method to reduce the thickness of the backlight module. In some embodiments, the outer glass or the outer plastic of the existing backlight module can also be omitted to further reduce the thickness of the liquid crystal panel;

(2) The second metal wire gate layer of the array substrate is formed by a nano-imprinting method, wherein the second metal wire gate layer can be used as a built-in polarizing sheet, so the thickness of the liquid crystal panel can be reduced.

(3) By forming the first metal wire gate layer, placing of the brightness enhancement film can be removed or the number of brightness enhancement films can be reduced, so the thickness of the liquid crystal panel can be reduced.

(4) The first metal wire gate layer is formed by a nano-imprinting method to reduce the thickness of the QDCF type liquid crystal panel.

(5) The first metal wire gate layer of the QDCF type liquid crystal panel is formed by a nano-imprinting method, which can simplify process difficulty of the QDCF type liquid crystal panel.

The present disclosure further provides a liquid crystal panel, which can be fabricated by using the method of fabricating the liquid crystal panel of any one of embodiments of the present disclosure.

It should also be mentioned that the liquid crystal panel of an embodiment of the present disclosure is not limited to the method of fabricating the liquid crystal panel of any one of embodiments of the present disclosure, as described below.

Please refer to FIGS. 2A to 2D together. An embodiment of the present disclosure provides a liquid crystal panel 20 (or a liquid crystal panel 20A), wherein the liquid crystal panel 20 (or a liquid crystal panel 20A) includes: a backlight module 21 and an array substrate 22 facing each other; and a first metal wire gate layer 226 disposed between the backlight module 21 and the array substrate 22, wherein the first metal wire gate layer 226 is formed through a nano-imprinting step to have a thickness greater than zero and less than or equal to 0.1 mm, the first metal wire gate layer 226 comprises a plurality of first metal wires 226A, a distance between the plurality of first metal wires 226 is greater than zero and less than 120 nm (e.g., 1, 2, 3, 5, 10, 20, 40, 50, 60, 70, 90, 100, or 110 nm), and each of the plurality of first metal wires 226A has a width greater than zero and less than 60 nm (e.g., 1, 2, 3, 5, 10, 20, 40, 50, 55 nm).

It should be mentioned here that the first metal wire gate layer 226 with nanostructures can be quickly formed through the nano-imprinting step, wherein the plurality of first metal wires 226A form the nanostructure, the thickness of which is smaller than the thickness of the metal wire gate layer in the prior art, and has a nano-level pitch and width, thereby reducing the thickness of the liquid crystal panel 20 (or the liquid crystal panel 20A).

It should be mentioned that the liquid crystal panel 20 (or the liquid crystal panel 20A) of the embodiment of the present disclosure may include each film layer or component mentioned in each embodiment in the above-described method 10 of fabricating a liquid crystal panel. Since it has been described in detail above, it will not be repeated here.

The present disclosure is described by the above-mentioned related embodiments. However, the above-mentioned embodiments are only examples for implementing the present disclosure. It must be pointed out that the disclosed embodiments do not limit the scope of the present disclosure. On the contrary, modifications and equivalent arrangements included in the spirit and scope of the claims are all included in the scope of the present disclosure.

The invention claimed is:

1. A liquid crystal panel, comprising:
a backlight module and an array substrate facing each other,
wherein the array substrate comprises an outer glass, a quantum dot color filter, a liquid crystal layer, and a substrate, and
the backlight module comprises a light source and a polarizing sheet, wherein the light source is adjacent to the polarizing sheet,
the polarizing sheet comprises a reflecting sheet, a light guide plate disposed on the reflecting sheet, and a diffusion sheet disposed on the light guide plate,
the light guide plate comprises a plurality of dots formed by the nano-imprinting, each dot of the plurality of dots has a size between 0.1 mm and 1 mm, a pitch between every two adjacent dots of the plurality of dots is between 0.1 mm and 10 mm, and
the light source is adjacent to the light guide plate; and
a first metal wire gate layer disposed on the array substrate, between the backlight module and the substrate of the array substrate and away from the liquid crystal layer, wherein the first metal wire gate layer is formed through nano-imprinting to have a thickness greater than zero and less than or equal to 0.1 mm, the first metal wire gate layer comprises a plurality of first metal wires, a distance between every two adjacent first metal wires of the plurality of first metal wires is greater than zero and less than 10 nm, each of the plurality of first metal wires has a width greater than zero and less than 10 nm, and the first metal wire gate layer comprises at least one of aluminum, iron, copper, chromium, silver, and gold;
wherein the array substrate further comprises a second metal wire gate layer, the second metal wire gate layer is a built-in polarizing sheet formed by the nano-imprinting, and
the outer glass, the quantum dot color filter, the second metal wire gate layer, the liquid crystal layer, and the substrate are arranged in sequence.

2. The liquid crystal panel according to claim 1, wherein the polarizing sheet further comprises a brightness enhancement film disposed between the first metal wire gate layer and the diffusion sheet.

3. The liquid crystal panel according to claim 1, wherein the polarizing sheet further comprises a glass substrate disposed on the diffusion sheet, and the first metal wire gate layer is disposed on the glass substrate.

4. A liquid crystal panel, comprising:
a backlight module and an array substrate facing each other,
wherein the array substrate comprises an outer glass, a quantum dot color filter, a liquid crystal layer, and a substrate, and
the backlight module comprises a light source and a polarizing sheet, wherein the light source is adjacent to the polarizing sheet,
the polarizing sheet comprises a reflecting sheet, a light guide plate disposed on the reflecting sheet, and a diffusion sheet disposed on the light guide plate,
the light guide plate comprises a plurality of dots formed by the nano-imprinting, each dot of the plurality of dots has a size between 0.1 mm and 1 mm, a pitch between every two adjacent dots of the plurality of dots is between 0.1 mm and 10 mm, and
the light source is adjacent to the light guide plate; and
a first metal wire gate layer disposed on the array substrate, between the backlight module and the substrate of the array substrate and away from the liquid crystal layer, wherein the first metal wire gate layer is formed through nano-imprinting to have a thickness greater than zero and less than or equal to 0.1 mm, the first metal wire gate layer comprises a plurality of first metal wires, a distance between every two adjacent first metal wires of the plurality of first metal wires is greater than zero and less than 10 nm, and each of the plurality of first metal wires has a width greater than zero and less than 10 nm;

wherein the array substrate further comprises a second metal wire gate layer, the second metal wire gate layer is a built-in polarizing sheet formed by the nano-imprinting, and the outer glass, the quantum dot color filter, the second metal wire gate layer, the liquid crystal layer, and the substrate are arranged in sequence.

5. The liquid crystal panel according to claim 4, wherein the polarizing sheet further comprises a brightness enhancement film disposed between the first metal wire gate layer and the diffusion sheet.

6. The liquid crystal panel according to claim 4, wherein the polarizing sheet further comprises a glass substrate disposed on the diffusion sheet, and the first metal wire gate layer is disposed on the glass substrate.

7. The liquid crystal panel according to claim 4, wherein material of the first metal wire gate layer comprises at least one of aluminum, iron, copper, chromium, silver, and gold.

8. A method of fabricating a liquid crystal panel, comprising:

providing a backlight module and an array substrate, wherein the array substrate comprises an outer glass, a quantum dot color filter, a liquid crystal layer, and a substrate that are arranged in sequence, and the backlight module comprises a light source and a polarizing sheet, wherein the light source is adjacent to the polarizing sheet, the polarizing sheet comprises a reflecting sheet, a light guide plate disposed on the reflecting sheet, and a diffusion sheet disposed on the light guide plate, the light guide plate comprises a plurality of dots formed by nano-imprinting, each dot of the plurality of dots has a size between 0.1 mm and 1 mm, a pitch between every two adjacent dots of the plurality of dots is between 0.1 mm and 10 mm, and the light source is adjacent to the light guide plate;

performing a nano-imprinting operation to form a first metal wire gate layer on the array substrate, wherein the first metal wire gate layer has a thickness greater than zero and less than or equal to 0.1 mm, the first metal wire gate layer comprises a plurality of first metal wires, a distance between every two adjacent first metal wires of the plurality of first metal wires is greater than zero and less than 10 nm, and each of the plurality of first metal wires has a width greater than zero and less than 10 nm; and assembling the backlight module and the array substrate, wherein the first metal wire gate layer is located between the backlight module and the substrate of the array substrate and is away from the liquid crystal layer, wherein the array substrate further comprises a second metal wire gate layer, the second metal wire gate layer is a built-in polarizing sheet formed by the nano-imprinting, and the outer glass, the quantum dot color filter, the second metal wire gate layer, the liquid crystal layer, and the substrate are arranged in sequence.

9. The method of fabricating the liquid crystal panel according to claim 8, wherein the second metal wire gate layer comprises at least one of aluminum, iron, copper, chromium, silver, and gold.

* * * * *